(12) United States Patent
Boissy

(10) Patent No.: US 8,336,030 B1
(45) Date of Patent: Dec. 18, 2012

(54) SYSTEM AND METHOD FOR CODING STANDARD TESTING

(75) Inventor: David Boissy, Harvard, MA (US)

(73) Assignee: The MathWorks, Inc., Natick, MA (US)

( * ) Notice: Subject to any disclaimer, the term of this patent is extended or adjusted under 35 U.S.C. 154(b) by 728 days.

(21) Appl. No.: 12/558,305

(22) Filed: Sep. 11, 2009

(51) Int. Cl.
*G06F 9/44* (2006.01)

(52) U.S. Cl. ........................... 717/126; 717/122

(58) Field of Classification Search ............ 717/122, 717/125, 126
See application file for complete search history.

(56) References Cited

U.S. PATENT DOCUMENTS

| | | | |
|---|---|---|---|
| 7,120,572 B1 * | 10/2006 | Liang | 703/26 |
| 7,506,330 B2 | 3/2009 | Alexander, III et al. | |
| 7,571,431 B2 | 8/2009 | Hampapuram et al. | |
| 7,797,673 B2 | 9/2010 | Szpak | |
| 2003/0135476 A1 * | 7/2003 | Holland et al. | 706/47 |
| 2003/0188303 A1 * | 10/2003 | Barman et al. | 717/170 |
| 2005/0204298 A1 * | 9/2005 | Kemp | 715/762 |
| 2005/0216894 A1 | 9/2005 | Igarashi | |
| 2012/0159453 A1 * | 6/2012 | Zhao | 717/127 |

FOREIGN PATENT DOCUMENTS

WO    WO-2009/095741 A1    8/2009

OTHER PUBLICATIONS

"ecDIFF™ for Simulink®: Graphical Differencing Environment for Simulink® Models," ExpertControl GmbH, Mar. 25, 2008, pp. 1-2.
"PC-lint/FlexeLint," Reference Manual, Software Version 8.00 and later, Document Version 8.00, Gimpel Software, Jul. 2001, pp. 1-367.
Leppänen, Ville, "On Programming Style Checkers," Seminar on SE, Spring 2005, pp. 1-24.
"Cppcheck 1.55," Jun. 2012, pp. 1-20.
Worth, D.J., et al., "A Survey of C and C++ Software Tools for Computational Science," Science and Technologies Facilities Council, Dec. 2009, pp. 1-38.
"PolySpace® Products for C 7: Reference, " The MathWorks, Inc., Mar. 2009, pp. i-vi, 1-1 to 1-66, 2-1 to 2-50, 3-1 to 3-10, and 4-1 to 4-4.
"PolySpace® Products for C 7: Getting Started Guide, " The MathWorks, Inc., Mar. 2009, pp. i-viii, 1-1 to 1-12, 2-1 to 2-16, 3-1 to 3-28, 4-1 to 4-40, 5-1 to 5-16, 6-1 to 6-14, and Index-1 to Index-4.
"BridgeVIEW™ and LabVIEW™: Professional G Developers Tools Reference Manual, " National Instruments Corporation, May 1998, pp. 1-176.

* cited by examiner

*Primary Examiner* — Anna Deng
(74) *Attorney, Agent, or Firm* — Cesari and McKenna, LLP; Michael R. Reinemann

(57) ABSTRACT

A system facilitates verification of computer code. The system receives multiple versions of the computer code. A code verification engine checks the received code against one or more metrics, such as coding standard violations. A code differencing compares the received versions of computer code, and identifies the differences between them. An interactive presentation unit presents one or more analysis reports regarding coding violations located in the received versions. An analysis report includes a plurality of entries hierarchically organized in conformance with the entities of the received code. The analysis report indicates the number of coding violations identified for the entities of the received code in a side-by-side, comparative arrangement. A user can thus compare the number of coding violations present in the received versions.

21 Claims, 14 Drawing Sheets

FIG. 4

Run-time errors by programming unit / Run-time errors by category / MISRA violations by programming unit / MISRA violations by rule

| PROJECT 412 | RED ERRORS 414 | | ORANGE ERRORS 416 | | GRAY ERRORS 418 | | GREEN CHECKS 420 | | SELECTIVITY FOR 9/08 421 |
|---|---|---|---|---|---|---|---|---|---|
| | 9/08 414a | 7/08 414b | 9/08 416a | 7/08 416b | 9/08 418a | 7/08 418b | 9/08 420a | 7/08 420b | |
| + project1.sln | 22 | 13 | 50 | 37 | 0 | 0 | 153 | 153 | 0.78 |
| + project2.sln | 11 | 11 | 16 | 16 | 1 | 0 | 57 | 57 | 0.81 |

FIG. 5

Run-time errors by programming unit / Run-time errors by category / MISRA violations by programming unit / MISRA violations by rule

| PROJECT 412 | RED ERRORS 414 | | ORANGE ERRORS 416 | | GRAY ERRORS 418 | | GREEN CHECKS 420 | | SELECTIVITY FOR 9/08 421 |
|---|---|---|---|---|---|---|---|---|---|
| | 9/08 | 7/08 | 9/08 | 7/08 | 9/08 | 7/08 | 9/08 | 7/08 | |
| − project1.sln | 22 | 13 | 50 | 37 | 0 | 0 | 153 | 153 | 0.78 |
| + file11.c | 7 | 6 | 30 | 30 | 0 | 0 | 97 | 97 | 0.78 |
| + file12.c | 15 | 7 | 20 | 7 | 0 | 0 | 56 | 56 | 0.78 |
| + project2.sln | 11 | 11 | 16 | 16 | 1 | 0 | 57 | 57 | 0.81 |

| PROJECT 412 | RED ERRORS 414 | | ORANGE ERRORS 416 | | GRAY ERRORS 418 | | GREEN CHECKS 420 | | SELECTIVITY FOR 9/08 |
|---|---|---|---|---|---|---|---|---|---|
| 430 | 9/08 | 7/08 | 9/08 | 7/08 | 9/08 | 7/08 | 9/08 | 7/08 | |
| - project1.sln | 22 | 13 | 50 | 37 | 0 | 0 | 153 | 153 | 0.78 |
| - file11.c | 7 | 6 | 30 | 30 | 0 | 0 | 97 | 97 | 0.78 |
| func11a | 3 | 2 | 12 | 12 | 0 | 0 | 45 | 45 | 0.80 |
| func11b | 4 | 4 | 18 | 18 | 0 | 0 | 52 | 52 | 0.76 |
| - file12.c | 15 | 7 | 20 | 7 | 0 | 0 | 56 | 56 | 0.78 |
| func12a | 7 | 7 | 7 | 7 | 0 | 0 | 33 | 33 | 0.85 |
| func12b | 8 | N/A | 13 | N/A | 1 | N/A | 23 | N/A | 0.70 |
| - project2.sln | 11 | 11 | 16 | 16 | 1 | 0 | 57 | 57 | 0.81 |
| - file21.c | 11 | 11 | 16 | 16 | 1 | 0 | 57 | 57 | 0.81 |
| func21a | 5 | 5 | 3 | 3 | 1 | 1 | 14 | 14 | 0.87 |
| func21b | 6 | 6 | 13 | 13 | 0 | 0 | 43 | 43 | 0.79 |

FIG. 6

| RUN-TIME ERRORS BY PROGRAMMING UNIT 402 | RUN-TIME ERRORS BY CATEGORY 404 | | MISRA VIOLATIONS BY PROGRAMMING UNIT 406 | | MISRA VIOLATIONS BY RULE 408 | | | | | | |
|---|---|---|---|---|---|---|---|---|---|---|---|
| CATEGORY 712 | RED ERRORS 714 | | ORANGE ERRORS 716 | | GRAY ERRORS 718 | | GREEN CHECKS 720 | | SELECTIVITY FOR 9/08 | | |
| | 9/08 | 7/08 | 9/08 | 7/08 | 9/08 | 7/08 | 9/08 | 7/08 | | | |
| + Correctness failure (COR) | | | | | | | | | | | |
| + Pointer within bounds (IDP) | | | | | | | | | | | |
| + Function returns an initialized value (IR) | | | | | | | | | | | |
| + Non-initialized pointer (NIP) | | | | | | | | | | | |
| + Non-initialized variable (NIV) | | | | | | | | | | | |
| + Non-initialized local variable (NIVL) | | | | | | | | | | | |
| + Array index within bounds (OBAI) | | | | | | | | | | | |
| + Overflow (OVFL) 724h | 26 | 14 | | | | | | | | | |
| + Shift must be positive (SHF) | | | | | | | | | | | |
| + Underflow (UNFL) | | | | | | | | | | | |
| + Unreachable code (UNR) | | | | | | | | | | | |
| + Impossible Value on assigned (VOA) | | | | | | | | | | | |
| + Division by zero (ZDV) | | | | | | | | | | | |

FIG. 7

| CATEGORY | RED ERRORS | | ORANGE ERRORS | | GRAY ERRORS | | GREEN CHECKS | | SELECTIVITY FOR 9/08 |
|---|---|---|---|---|---|---|---|---|---|
| - | 9/08 | 7/08 | 9/08 | 7/08 | 9/08 | 7/08 | 9/08 | 7/08 | |
| + Correctness failure (COR) | | | | | | | | | |
| + Pointer within bounds (IDP) | | | | | | | | | |
| + Function returns an initialized value (IR) | | | | | | | | | |
| + Non-initialized pointer (NIP) | | | | | | | | | |
| + Non-initialized variable (NIV) | | | | | | | | | |
| + Non-initialized local variable (NIVL) | | | | | | | | | |
| + Array index within bounds (OBAI) | | | | | | | | | |
| − Overflow (OVFL) | 26 | 14 | | | | | | | |
| + project1.sln | 20 | 8 | | | | | | | |
| + project2.sln | 6 | 6 | | | | | | | |
| + Shift must be positive (SHF) | | | | | | | | | |
| + Underflow (UNFL) | | | | | | | | | |
| + Unreachable code (UNR) | | | | | | | | | |

FIG. 8

| RUN-TIME ERRORS BY PROGRAMMING UNIT | RUN-TIME ERRORS BY CATEGORY | | MISRA VIOLATIONS BY PROGRAMMING UNIT | MISRA VIOLATIONS BY RULE | | | | |
|---|---|---|---|---|---|---|---|---|
| CATEGORY | RED ERRORS | | ORANGE ERRORS | | GRAY ERRORS | | GREEN CHECKS | SELECTIVITY FOR 9/08 |
| - | 9/08 | 7/08 | 9/08 | 7/08 | 9/08 | 7/08 | 9/08 | 7/08 |
| + Correctness failure (COR) | | | | | | | | |
| + Pointer within bounds (IDP) | | | | | | | | |
| + Function returns an initialized value (IR) | | | | | | | | |
| + Non-initialized pointer (NIP) | | | | | | | | |
| + Non-initialized variable (NIV) | | | | | | | | |
| + Non-initialized local variable (NIVL) | | | | | | | | |
| + Array index within bounds (OBAI) | | | | | | | | |
| − Overflow (OVFL) | 26 | 14 | | | | | | |
| 726n ~ project1.sln | 20 | 8 | | | | | | |
| + file11.c | 6 | 7 | | | | | | |
| 724q ~ + file12.c | 14 | 1 | | | | | | |
| + project2.sln | 6 | 6 | | | | | | |
| + Shift must be positive (SHF) | | | | | | | | |

```
7/08
1  static void Square_Root_conv
2     (double alpha,
3      float *beta_pt)
4  {
5     *beta_pt = (float)
6        ((1.5 + cos (alpha) )
7        / 5.0) ;
8  }
9
10 static void Square_Root (void)
11 {
12    double alpha = random_float ();
13    float beta;
14    float gamma;
15
16    Square_Root_conv (alpha, &beta);
17    gamma = (float) sqrt (beta - 0.75);
18 }
19
20 static int get_oil_pressure (void)
21 {
22    volatile int vol_i;
23    int i;
24    i = vol_i;
25
26    return i;
27 }
```

```
9/08
1  static void Square_Root_conv
2     (double alpha,
3      float *beta_pt)
4  {
5     *beta_pt = (float)
6        ((1.5 + cos (alpha) )
7        / 5.0) ;
8  }
9
10 static void Square_Root (void)
11 {
12    double alpha = random_float ();
13    float beta;
14    float gamma;
15
16    if (0) {
17       dead_code ();
18    }
19
20    Square_Root_conv (alpha, &beta);
21    gamma = (float) sqrt (beta - 0.75);
22 }
23
24 static int get_oil_pressure (void)
25 {
26    volatile int vol_i;
27    int i;
28    i = vol_i;
29    assert (i > 0);
30
31    return i;
32 }
```

RULE: 15.3 (WARNING): THE FINAL CLAUSE OF A SWITCH STATEMENT SHALL BE THE DEFAULT CLAUSE.

FILE: MisraRule15_4.c LINE 34 (COLUMN 0)

SOURCE CODE

| SWITCH (MisraRule15_4_U.In1) {

FIG. 13

SYSTEM AND METHOD FOR CODING STANDARD TESTING

BACKGROUND OF THE INVENTION

Background Information

Software products, such as applications, scripts, programs or modules, are typically created by programmers using program development systems or environments. For large, complex software products, the development time may extend for several weeks or months, and may involve a team of programmers or developers. During that time, several versions of the software product may be created or built.

To ensure that the software product being developed performs as intended, it is often tested prior to release. One technique for testing software is known as static analysis, which is performed without executing the software. The code that makes up the software product is examined by a static analysis tool. The tool may be designed to identify areas in the code that are determined to have errors, and areas that are determined to operate correctly. The static analysis tool may also identify portions of the code that are not accessible, referred to as "dead code", as well as code portions for which a determination could not be made. The developers then examine these identified areas of the code and attempt to correct the identified errors.

Another technique for testing software is known a dynamic analysis, where the code is built into an executable program and the resulting executable is tested for defects either by analyzing the results of the program or results of tools that monitor the program. Such tools include memory analyzers to detect incorrect memory references or leaks and similar memory problems and performance analyzers too verify performance is acceptable.

For large, complex software products, each version may be subject to one or more static or dynamic analysis checks. As the software product proceeds through development, the number of errors identified by the static analysis tool is ideally reduced such that, by the release date, the errors identified by the static analysis tool are reduced to zero.

Both static and dynamic checks may be incorporated into coding standards or alternatively, the coding standards are validated by static and/or dynamic checks.

A well-known set of coding standards known as MISRA C and MISRA C++ for C and C++ safety critical code were developed by the Motor Industry Software Reliability Association (MISRA) for the automotive industry. For example, the current version, known as MISRA C: 2004, is used in many diverse industries beyond the automotive industry.

BRIEF DESCRIPTION OF THE DRAWINGS

The invention description below refers to the accompanying drawings, of which:

FIGS. 4-10 are schematic illustrations of analysis reports;

FIG. 12 is a schematic illustration of code comparison report;

FIG. 13 is a schematic illustration of a popup informational window; and

DETAILED DESCRIPTION OF AN ILLUSTRATIVE EMBODIMENT

Overview

Figure 1:
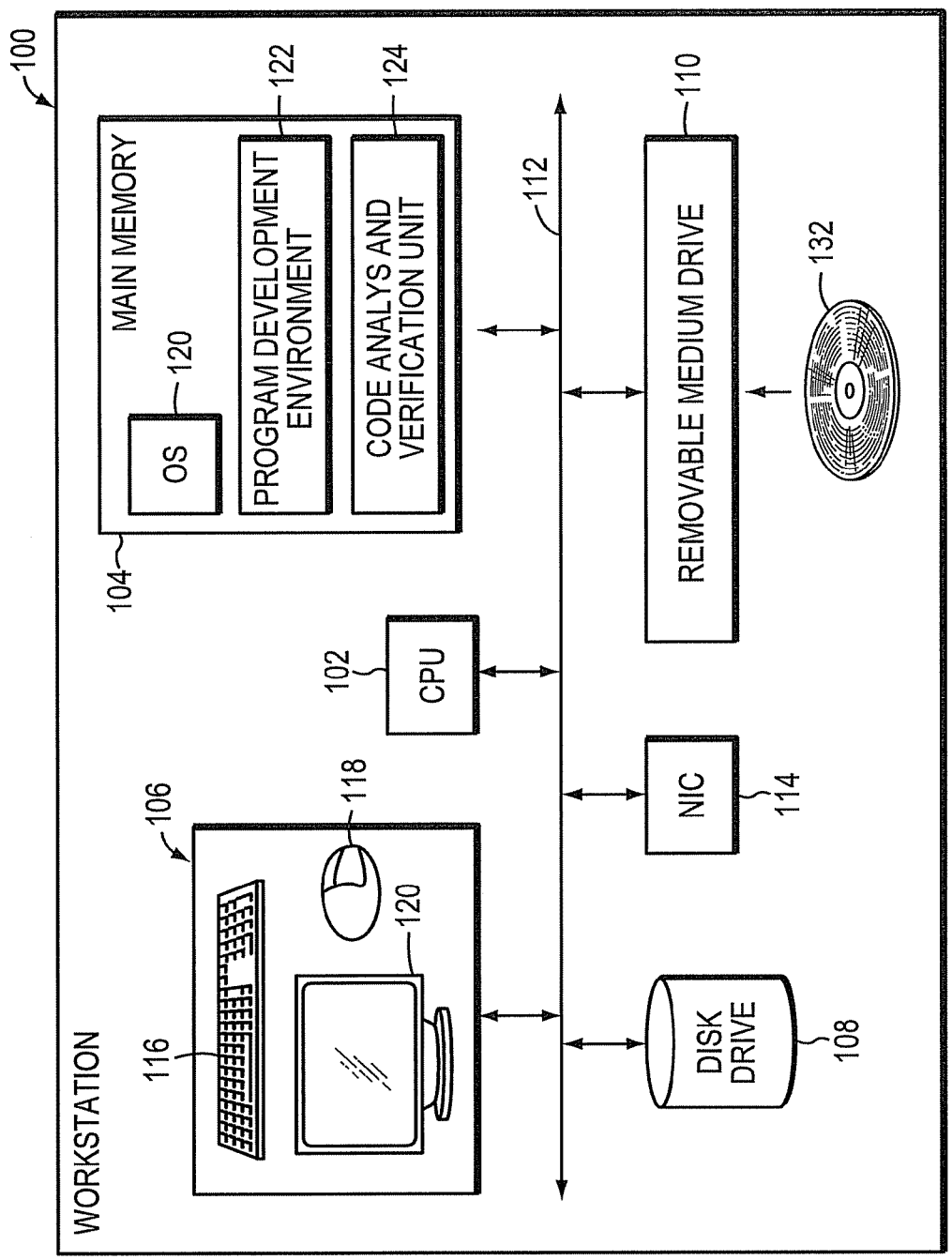
FIG. 1 is schematic illustration of a data processing device for use with the present invention.

Briefly, the invention relates to a system and method for facilitating the analysis or verification of computer code. The system receives at least two versions of the computer code, such as a current version and a prior version. A programmer may generate the versions of the computer code by interfacing with a program development environment. In an embodiment, each received version of the computer code may include a plurality of entities that are organized hierarchically into levels. At a top level, each version of the computer code may include one or more project entities. Each project entity may include one or more file entities and each file entity, in turn, may include one or more function entities. The system includes a code verification engine that is configured to check the received code against one or more metrics, such as coding standard violations. The code verification engine analyzes each of the received versions of computer code against its store of metrics or coding standards, and may identify one or more violations in each of the received versions, as well as the location of the violation in the respective version. The system further includes a code differencing engine. The code differencing engine is configured to compare the two received versions of computer code, and to identify the differences between them, such as the addition of new code, the deletion of previously existing code, and the modification of code.

The system also may include an interactive presentation unit coupled to the code verification and code differencing engines. A user may direct the interactive presentation unit to present one or more analysis reports regarding the coding standard violations that were located in each versions of the received code. In an embodiment, an analysis report includes a plurality of entries that are hierarchically organized in conformance with the entities that make up the received code, e.g., as a project tree that directly maps to the entities of the received computer code. The analysis report specifies the number of violations identified for each of the one or more entities. In addition, the analysis report may simultaneously present the number of coding standard violations for each received version of computer code in an adjacent, e.g., side-by-side, arrangement. In this way, a user can compare the number of coding standard violations present in the received versions, and quickly see whether the number of coding standard violation is decreasing, staying the same or increasing.

The analysis report, moreover, may organize the specified violations in terms of their severity. The severity may be visually represented to the user, for example, by using color coding. In an embodiment, the following color scheme may be used: red may indicate coding violations, orange may indicate code portions for which the lack or presence of violations has not been determined with certainty, gray may represent unexamined code, and green may indicated code that passes the analysis.

In response to the user selecting a particular entity, such as a project entity, from the analysis report, the presentation unit may expand at least a portion of the report to include entries for the file entities that make up the respective project, and the corresponding violations identified within each such file entities. Again, the coding violations for the entities of each received version of computer code may be presented in sideby-side, comparative arrangement. Similarly, in response to the user selecting a particular file entity, the presentation unit may expand at least a portion of the report to list each of the function entities that make up the selected file entity, and the violations identified within each such function entity for each received version in a side-by-side, comparative arrangement. In this way, the user can manipulate the analysis report, e.g., show or hide detail, in order to view coding violation information at a desired hierarchical level of the received code, e.g., project, file or function level, and also efficiently move between the various hierarchical levels of the received computer code.

In an embodiment, the user also may direct the presentation unit to present a comparative listing of the two versions of the received computer code. Specifically, the user may select a project, file or function entity from the analysis report. The presentation unit may display a source code listing of the selected project, file or function entity from both the current and prior versions aligned side-by-side. The source code listings may be annotated to show where new code has been added, existing code has been modified, and prior code has been deleted. In addition, the presentation unit may be configured to overlay the coding standard violations onto the source code listings of the selected project, file or function entities for both the current and prior versions of received computer code. In this way, the user may determine exactly where the coding standard violations occur in the received code.

Code Verification System

FIG. 1 a schematic hardware illustration of a workstation 100. The workstation 106 may include a central processing unit (CPU) 102, a main memory 104, user input/output/106, a disk drive 108, a removable medium drive 110, and one or more network interface cards (NICs) 114 that are interconnected by a system bus 112. The main memory 104 may store a plurality of programs, libraries or modules, such as an operating system 120, and one or more applications running on top of the operating system 120, including a program development environment 122, and a code analysis and verification unit 124. The removable medium drive 110 is configured to accept and read a computer readable medium 132, such as a CD, DVD, floppy disk, solid state drive, tape, flash memory or other medium. The removable medium drive 110 may further be configured to write to the computer readable medium 132.

The user I/O 106 may include a keyboard 116, a pointing device, such as a mouse 118, and a display 120. It should be understood that other or additional user I/O may be provided, such as a touch screen, a touch pad, a printer, etc.

Suitable processors include single or multicore processors, such as the Core™ Pentium®, or Celeron® families of processors from Intel Corp. of Santa Clara, Calif., or the Phenom, AMD Athlon or AMD Opteron families of processors from Advanced Micro Devices, Inc. of Sunnyvale, Calif., among others.

Suitable operating systems 120 include the Windows series of operating systems from Microsoft Corp. of Redmond, Wash., the Linux operating system, the MAC OS® series of operating systems from Apple Inc. of Cupertino, Calif., and the UNIX® series of operating system, among others.

It should be understood that the program development environment 122 may be a text-based programming system, a visual programming system, a graphical programming system or some combination thereof. Suitable program development environments 122 include the MATLAB® and Simulink® technical computing environments as well as the Stateflow® and SimEvents® modeling systems from The MathWorks, Inc. of Natick, Mass., the .NET programming system from Microsoft Corp. of Redmond, Wash., the Lab-VIEW programming environment from National Instruments Corp. of Austin, Tex., the Visual Engineering Environment (VEE) from Agilent Technologies, Inc. of Santa Clara, Calif., the Khoros development system from AccuSoft Corp. of Northborough, Mass., a C programming environment, and a C++ programming environment, among others.

Suitable workstations include Dell Precision series of workstations from Dell, Inc. of Round Rock, Tex., the HP Z400, Z600 and Z800 series of workstations from Hewlett Packard Co. of Palo Alto, Calif., among others.

Nonetheless, those skilled in the art will understand that the workstation 100 of FIG. 1 is meant for illustrative purposes only and that the present invention may be used with other data processing devices, computer systems, processing systems or computational devices, such as personal computers (PCs), laptops, palm computers and other portable computing devices, smart phones, electronic readers (e-readers) etc.

It should also be understood that the workstation 100 need not include the program development environment 122.

Figure 2:
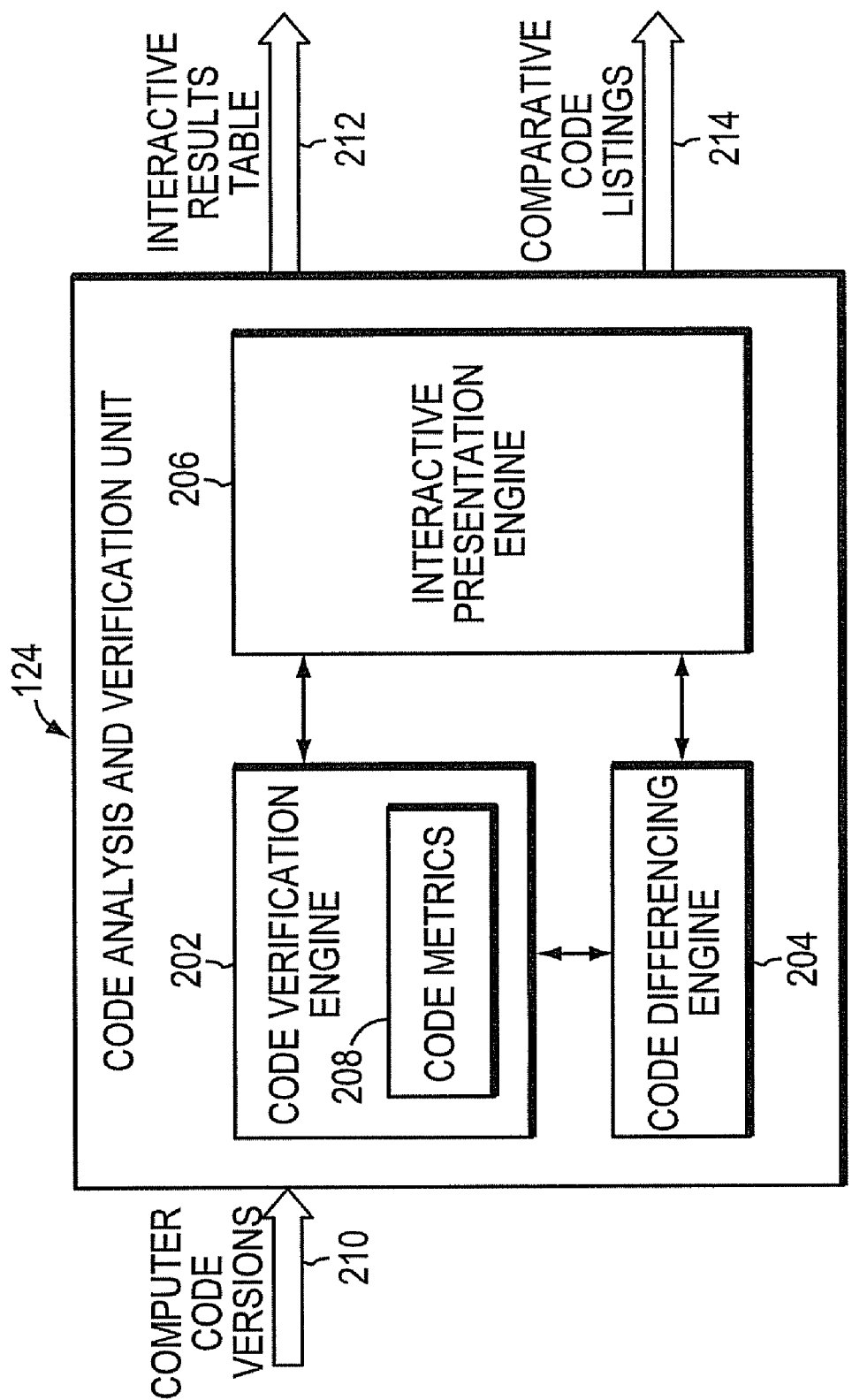
FIG. 2 is a schematic illustration of a code analysis and verification engine in accordance with an embodiment of the present invention.

FIG. 2 is a schematic, functional illustration of the code analysis and verification unit 124. The code analysis and verification unit 124 may include a code verification engine 202, a code differencing engine 204 and an interactive presentation engine 206. The code verification engine 202 may include code metrics 208. The code analysis and verification unit 124 may receive one or more versions of computer code under development, as indicated by arrow 210. The code analysis and verification unit 118 may output one or more interactive reports, as indicated by arrow 212, and one or more comparative code listings, as indicated by arrow 214.

The code verification engine 202 may be configured to perform static analysis testing, dynamic analysis testing, other code testing, or some combination thereof. The phrase "static analysis testing" refers to the analysis of computer code that is performed without executing the code. For example, static analysis testing may examine code using abstract interpretation techniques to verify all possible execution paths of a program. The phrase "dynamic analysis testing" refers to verification of computer code performed by or during the execution of that computer code. The code may be executed with a set of test input values.

Suitable code verification engines for use with the present invention include the verification tool described in PCT Patent Application No. PCT/FR2008/000122, filed Feb. 1, 2008, titled Selective Code Instrumentation for Software Verification, which is hereby incorporated by reference in its entirety, PolySpace® verification software from The Math-Works, Inc. of Natick, Mass., MISRA-C:2004 from the Misra Consortium of Warwickshire, UK, and PC-lint software from Gimpel Software of Collegeville, Pa., among others. As indicated, the code verification engine 202 may include or otherwise have access to a set of metrics used by that code analysis and verification unit in its analysis of received code. The PolySpace® verification software, for example, analyzes received code against a set of preconfigured run-time errors (RTEs), such as non-initialized variables (NIV/NIVL), non-initialized pointers (NIP), scalar and float underflows (UNFL), scalar or float division by zero (ZDV), wrong type for argument (COR), non termination of call or loop, unreachable code (UNR), etc.

It should be understood that the code metrics 208 utilized by the code verification engine 202 may relate or otherwise check for correctness, completeness, reliability, number of bugs, efficiency, compatibility, satisfaction of design requirements, etc.

As described herein, the code differencing engine 204 may perform a comparison between the received versions of computer code to determine newly added code, deleted code and modified code. Suitable code differencing engines for use with the present invention include the Araxis Merge file comparison software product from Araxis Ltd. of Isle of Man, UK, and the UNIX diff file comparison utility, among others. The difference engine may be based on longest common subsequence identification.

For code representing graphical models, the differencing engine 204 may perform a comparison between the received versions of graphical computer code to determine newly added code, deleted code and modified code. Suitable code differencing engines for graphical diagrams can be created using the techniques presented in *Change Detection in Hierarchically Structured Information*, Sudarshan Chawathe, Anand Rajaraman, and Jennifer Widom; SIGMOD Conference, Montreal, Canada, June 1996, pp. 493-504.

The code verification engine 202, code differencing engine 204 and interactive presentation engine 206 may each comprise registers and combinational logic configured and arranged to produce sequential logic circuits. In an embodiment, the code verification engine 202, code differencing engine 204 and interactive presentation engine 206 are or include software modules or libraries containing program instructions pertaining to the methods described herein, that may be stored on computer readable media, such as main memory 104 and/or computer readable medium 132, and executable by one or more processing elements, such as CPU 102. Other computer readable media may also be used to store and execute these program instructions. In alternative embodiments, various combinations of software and hardware, including firmware, may be utilized to implement the present invention.

The code analysis and verification unit 124 may be implemented as an add-on tool to the program development environment 122. Accordingly, the code analysis and verification unit can analyze code created within environment 122.

Figure 3A:
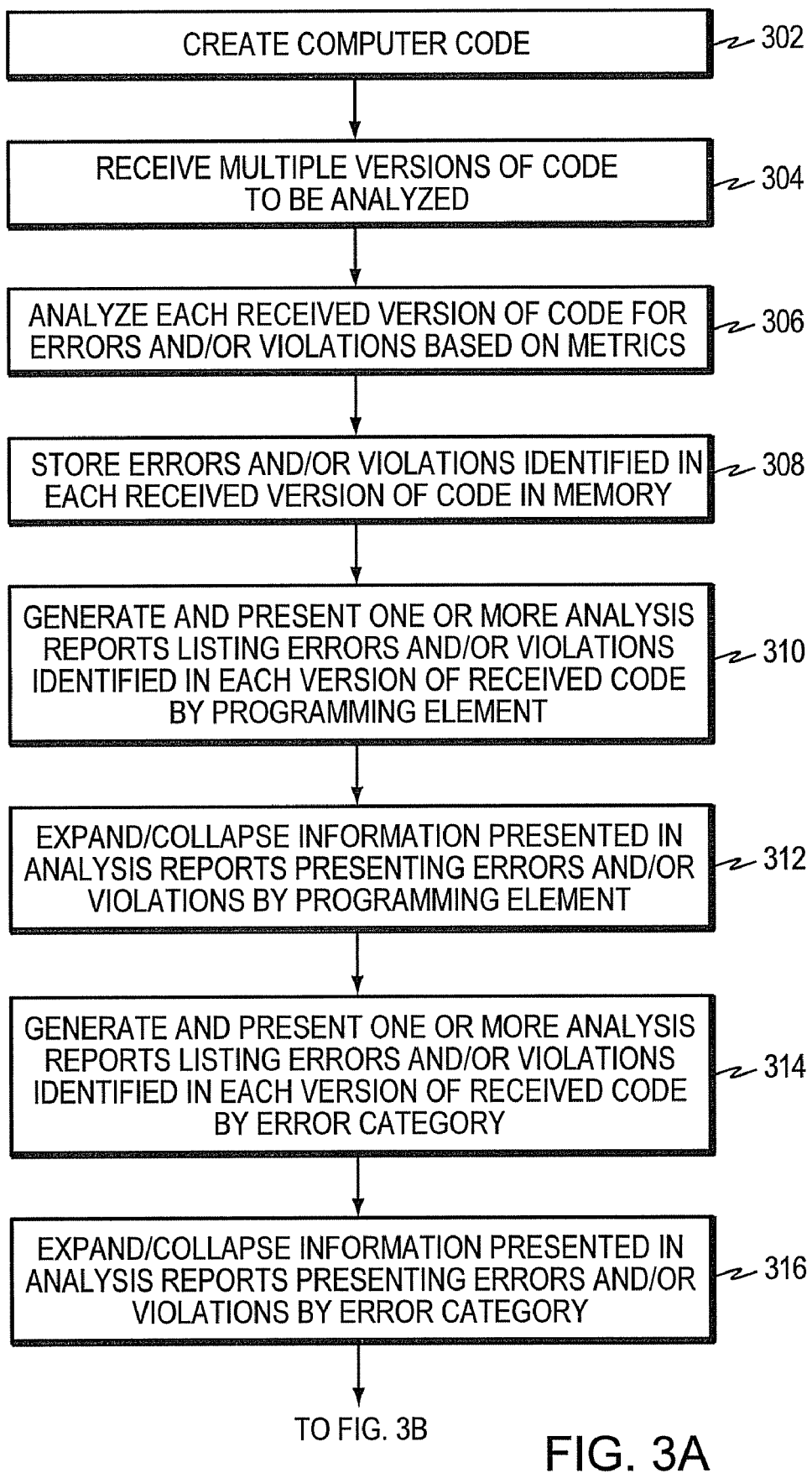
FIGS. 3A and 3B are a flow diagram of a method in accordance with an embodiment of the present invention.
Figure 3B:
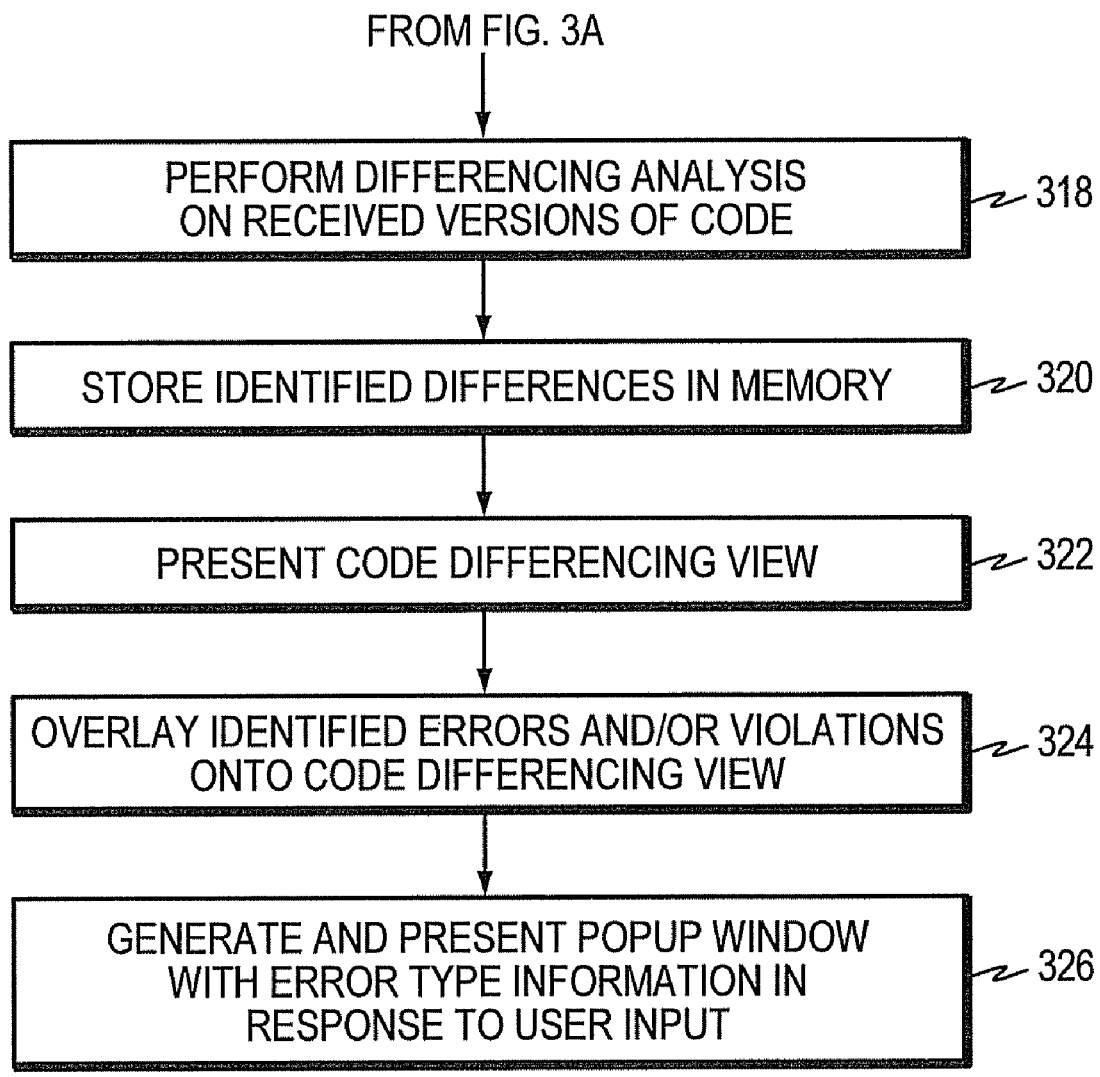

FIGS. 3A-B are a flow diagram of a method in accordance with an embodiment of the present invention. In operation, one or more developers or computer programmers may create a computer program, as indicated at block 302. For example, the programmers may utilize the keyboard 116, mouse 118 and computer display 120 of the user I/O 106 at the workstation 100 to operate the program development environment 122, and create one or more versions of the software being developed. At least two versions of the software may be received by the code analysis and verification unit 124, as indicated at block 304. In an embodiment, the code analysis and verification unit 124 receives a current version of the software being developed and a prior version, such as the version that existed just prior to the current version, which may be referred to as a "base" version. Nonetheless, those skilled in the art will understand that the code analysis and verification unit 124 may receive other and/or additional versions of the code.

It should be understood that the received software, program, script, module, code snippet, etc. may be written or created in a number of different programming languages, such as C, C++, C#, assembly code, hardware description language (HDL), hardware synthesis, Java, Ada, structured text for a programmable logic controller (PLC), and the MATLAB® environment. Nonetheless, those skilled in the art will understand that the received code may correspond to other programming languages.

It should be understood that the received software, program, script, module, code snippet, etc. may be written in a graphical programming language such as the time-based block diagrams within Simulink, state charts such as those found within Stateflow, discrete-event diagrams such as those found within SimEvents, physical modeling diagrams such as those found within SimMechanics, data flow diagrams. A characteristic shared among these diagrams is that they define semantics suitable for simulation or execution.

A user may run the code analysis and verification unit 124, e.g., by entering a command or selecting a command button from within the program development environment 122. The code analysis and verification unit 124 may have a main interface, such as a graphical user interface (GUI) for presentation on display 120, from which the user may select the versions of code to be received, e.g., through a dialog box. Alternatively the main user interface of 124 may be a printable or viewable textual report. The received code may be textual source code from one or more files, code describing a graphical model or block diagram, a graphical model or block diagram, an intermediate representation of textual and/or graphical code, or various combinations thereof. The user may also provide the code analysis and verification unit 124 with one or more input parameters. These input parameters may, for example, include the particular algorithms to be used during the analysis process, options relating to the analysis, etc.

It should be understood that the code received by the code analysis and verification unit 124 may be stored in memory, such as disk drive 108, or on a removable medium, such as medium 132. The code may also be transmitted to the workstation from a remote device.

The code verification engine 202 runs an analysis of each received version of the code, as indicated at block 306. In an embodiment, the code verification engine 202 analyzes the received code based on the code metrics 208. For example, the code verification engine 202 may identify a plurality of run-time errors that exist in both the current version and the base version of the received code. As will be appreciated, the run-time errors identified in the current version of the received code may be different than the run-time errors identified in the base version. For example, there may be fewer, greater or different errors.

The errors identified in the received versions of the code, including the type or category of error and the location of the identified error within the respective code, may be stored in memory, such as in main memory 104 (FIG. 1), by the code verification engine 202, as indicated at block 308.

The interactive presentation engine 206 may access the violations or errors identified in the received versions of the code, and generate one or more interactive, comparative analysis reports. In an embodiment, an analysis report may present the identified violations or errors in terms of the programming entities or elements that form the received code, as indicated at block 310. The interactive presentation engine 206 may present the analysis reports to the user, as also indicated at block 310. For example, the interactive presentation engine 206 may display the reports on the display 120 (FIG. 1) as a Graphical User Interface (GUI) having a plurality of elements. The interactive presentation engine 206 may alternatively or additionally print a copy of the analysis reports, store the results in a database, incorporate the results into a file, such as an Excel spreadsheet, etc.

Multi-Version Comparative Reports

FIG. 4 is a schematic illustration of an analysis report 400 according to an embodiment. The analysis report 400 may include a plurality of tabbed regions where each region contains different information. For example, the report 400 may include a Run-Time Errors By Programming Unit tabbed region 402, a Run-Time Errors By Category tabbed region 404, a MISRA Violations By Programming Unit tabbed region 406, and a MISRA Violations By Rule tabbed region 408. In response to the selection of a tab by the user, e.g., with the mouse 118, the interactive presentation engine 206 may be configured to bring the selected tabbed region of the report 400 to the front of the display 120. By default, the interactive presentation engine 206 may be configured to show the Run-Time Errors By Programming Unit tabbed region 402.

The Run-Time Errors By Programming Unit tabbed region 402 may be organized as a table or array having a plurality of rows and columns whose intersections define cells for holding information. Specifically, the Run-Time Errors By Programming Unit tabbed region 402 may include a plurality of rows, such as rows 410a, 410b, each corresponding to a portion of the received code. In an embodiment, each row 410 of the Run-Time Errors By Programming Unit tabbed region 402 corresponds to a separate and distinct portion of the received code, such as a programming element or entity. Suppose, for example, that each version of the received code includes a plurality of entities organized into three hierarchical levels with the top level being the 'project' level, the next level being the 'source file' level, and the lowest level being the 'function' level. Suppose further that the received code includes two project entities at its highest hierarchical level, e.g., a "project1.sln" project and a "project2.sln" project. In an embodiment, the interactive presentation engine 206 generates the Run-Time Errors By Programming Unit tabbed region 402 to provide a separate row for each of these two project entities. That is, the "project1.sln" entity corresponds to row 410a, and the "project2.sln" entity corresponds to row 410b.

Tabbed region 402 presents the number of violations or errors that were identified in each version of the received code by the code verification engine 202 in terms of the entities or elements of the received code. The number of violations or errors for each version of received code is included in the tabbed region 402 so as to permit direct comparison of the results for each version of received code. In an embodiment, the number of violations is presented in a side-by-side arrangement to permit direct comparison. As described herein, the interactive presentation engine 206, in response to user input, may also change which entities or elements are included in the tabbed region 402.

Tabbed region 402 also includes a plurality of columns, including a project column 412 that contains the respective names of the entities or programming elements corresponding to each row 410 of the tabbed region 402. Tabbed region 402 also includes a plurality of columns that correspond to the violations or errors identified in the received versions of the code by the code verification engine 202. In an embodiment, the violations or errors may be categorized by type or severity, such as red, orange, gray and green. A category red error may refer to a run-time error that occurs every time the code is run. A category orange error may refer to a run-time error that might occur when the code is run. A category gray error may refer to unreachable code. A category green check may refer to an operation contained in the analyzed code that never results in an error.

Specifically, the tabbed region 402 may include a red error column 414, an orange error column 416, a gray error column 418, and a green check column 420. Within each column 414-420 is a column that corresponds to each version of the received code, and stores the number of errors or violations identified for that version. Suppose, for example, that the received code included two versions, a "9/08" version and a "7/08" version, where the "7/08" version represents the base version. In this example, the red error column 414 includes a "9/08" column 414a, and a "7/08" sub column 414b that is adjacent to the "9/08" column 414a. The tabbed region 402 may also include one or more selectivity columns, such as selectivity column 421, whose value represents the total number of red, green and gray checks. This provides a level a proof of the analysis process.

As shown in the tabbed region 402, the "9/08" version of the received code has 22 category red errors, while the "7/08" version only had 13. In other words, the number of category red errors has actually increased, there by signaling a regression in the fixing of errors between the "7/08" and "9/08" versions. Similarly, while version "7/08" had 37 category orange errors, version "9/08" has 50. In contrast, the number of gray category errors and green checks have remained unchanged at zero and 153, respectively. For the "project2.sln" entity, the number of red and orange category errors remained unchanged between the "7/08" and "9/08" versions of the code at 11 and 16, respectively. The gray category errors increased from zero to one, and the green category checks remained the same at 57.

As shown in the tabbed region 402, the errors or violations identified in each version of the received code may be presented side-by-side so that a user may make a direct comparison of the errors that exist in each version of the received code. That is, an advantage of the present invention is that it permits a user to quickly see whether the number of coding violations or errors in the code being developed is being reduced as subsequent versions are created. Likewise, a user can see whether the number of coding violations or errors is increasing. A user, such as a project manager, can thus confirm that coding violations are being resolved, or quickly take action to address a rise in coding violations.

Significantly, the interactive presentation engine 206 can also dynamically change the level of detail of error information presented in the tabbed region 402. Specifically, the interactive presentation engine 206 can present more detailed error information or alternatively more general or summarized error information, as indicated at block 312. The interactive presentation engine 206 can expand the amount of information being presented in the tabbed region 402, or collapse the information to a more general or summary form in response to user input.

Suppose, for example, that the project manager, would like to obtain additional detail as to where the new coding violations or errors that were discovered in the "9/08" version of the "project1.sln" entity are located. The project manager may direct the interactive presentation engine 206 to provide this additional information. More specifically, each row 410 of the tabbed region 402 that corresponds to a project entity, such as rows 410a and 410b, may include a corresponding expander command button, 424a, 424b, which may be represented as plus signs. Upon selection of the expander button, such as button 424a, which corresponds to the "project1.sln" entity, the interactive presentation engine 206 modifies the tabbed region 402, e.g., redraws it on the display 120, to include information for each of the entities at the next lower hierarchical level of the selected entity, i.e., the "project1.sln" entity.

Suppose, for example, that there are two file entities below the "project1.sln" entity: a "file11c" file and a "file12.c" file. The interactive presentation engine 206 will retrieve the number of coding violations or errors found in each of these two files by the code verification engine 202, and add this information to a revised version of the tabbed region.

FIG. 5 is a schematic illustration of a revised version 502 of the Run-Time Errors By Programming Unit tabbed region.

The revised version 502 includes additional detail regarding the coding violations or errors located in the "project1.sln" entity. Specifically, the revised tabbed region 502 includes two new rows, a first new row 410c that corresponds to the "file11.c" entity and a second new row 410d that corresponds to the "file12.c" entity. For each new row, the interactive presentation engine 206 populates the cells of that row with the number of coding violations or errors for the respective entity as obtained by the interactive presentation engine 206 from the code verification engine 202.

By reviewing the information contained in the revised analysis report 502, the project manager can obtain further insight into the coding violations or errors that exist in the current version of the software, i.e., version "9/08". Specifically, as shown, in FIG. 5, most of the nine new category red errors that were identified in the "project1.sln" entity actually occurred in the "file12.c" file, which shows an additional eight (from seven to 15) new category red errors between the "7/08" baseline version and the current "9/08" version. Only one additional category red error (from six to seven) was found in the "file11.c" file. Similarly, all of the 13 new orange category errors that were found in the "9/08" version of the "project1.sln" project actually occurred in the "file12.c" file.

Because another hierarchical level of the received code exists below the file level, the interactive presentation engine 206 may include an expander button for each of the new rows 410c and 410d that correspond to files "file11.c" and "file12.c". Specifically, new row 410c may have expander button 424c, and new row 410d may have expander button 424d. In response to selection of either expander button 424c or 424d by the user, e.g., with the mouse 118, the interactive presentation engine 206 may further revise the tabbed region 502 to include additional rows for the entities or program elements organized below the file level, e.g., function entities.

In addition, the interactive presentation engine 206 may replace the expander button 424a for the "project1.sln" entity with a collapse command button on the revised tabbed region 502, such as command button 426a, which may be represented as a minus sign. In response to the selection of the collapse command button 426a by a user, the interactive presentation engine 206 may revise the tabbed region 502 by eliminating rows 410c and 410d, essentially returning the tabbed region 502 back to the form illustrated in FIG. 4.

The interactive presentation engine 206 may also include a global expander command button on the tabbed region 402 (FIG. 4), such as global expander button 422. In response to a user selecting the global expander button 428, the interactive presentation engine 206 may revise the tabbed region 402 by adding rows for each program element or unit in the hierarchy of the received code.

FIG. 6 is a schematic illustration of a fully expanded tabbed region 602 for the "9/08" and "7/08" versions of received code. As shown, the "file11.c" file entity of the "project1.sln" entity includes two lower level entities or program elements, i.e., a "func11a" function and a "func11b" function. Accordingly, the interactive presentation engine 206 has modified the tabbed region 402 (FIG. 4) by adding new rows 410e and 410f for these two functions. Similarly, the "file12.c" file has two functions, "func12a" and "func12b", and new rows 410g and 410h, have been added for them. The "project2.sln" entity has one file, "file21a", which in turn has two functions, "func21a" and "func21b". New rows 410i-k have been added for these entities.

For each row 410a-k, the corresponding number of red, orange, and gray errors and green checks that were identified by the code verification engine 202 for each version, "9/08" and "7/08", are listed. If a particular entity or program element did not exist in a version, then this condition is indicated by the information contained in the respective cell. In particular, suppose that the "func12b" function did not exist in the "7/08" version of the received code. Accordingly, the corresponding cells may contain the acronym "N/A" for not available.

As illustrated in FIG. 6, the interactive presentation engine 206 may order the entities in column 412 in a project tree format. In addition, engine 206 may include additional graphical elements to highlight the places where the number of errors or violations in the current version of the received code is higher than in the base version. For example, the cells corresponding to these entities, such as "file11.c", "func11a", "func11b", and "file12.c" may be shaded. In this way, the locations at which errors or violations are regressing may be quickly identified by the project manager.

The fully expanded tabbed region 402 may include a global collapse command button 430 (FIG. 6). In response to a user selecting the global collapse button 430, the interactive presentation engine 206 may create a tabbed region that only includes rows for the highest level programming elements or components of the received code, such as the tabbed region 402 of FIG. 4.

It should be understood that, depending on the complexity and hierarchical organization of the received code, the tabbed region 602 generated by the interactive presentation engine 206 may include far more entries than illustrated herein.

It should also be understood that the information presented in tabbed regions 402, 502 and 602 may be presented in other forms or arrangements.

FIG. 7 is a schematic illustration of the Run-Time Errors By Category region 404 of the analysis report 400, which may be generated and presented by engine 206, as indicated at block 314. The Run-Time Errors By Category tabbed region 404 also may be organized as a table or array having a plurality of rows and columns whose intersections define cells for holding information. Specifically, the Run-Time Errors By Category tabbed region 404 may include a plurality of rows, such as rows 710a-m. Each row 710 corresponds to a particular category or type of error or violation that was searched for by the code verification engine 202 (FIG. 2) during its analysis of the received code. For example, row 710a corresponds to a Correctness Failure (COR) error, row 710b corresponds to a Pointer within bounds (IDP) error, row 710c corresponds to a Function returns an initialized value (IR) error, and so on. Tabbed region 404 presents the violations or errors that were identified in each version of the received code by the code verification engine 202 in terms of the type or category of errors that were searched for. To the extent the code verification engine 202 searched for additional errors, a vertical scroll bar 708 or other graphical command object may be included in the tabbed region 404.

As shown, tabbed region 404 includes a plurality of columns, including a Category column 712 that contains the names of the types or categories of errors or violations searched for by the code verification engine 202. Tabbed region 404 also includes a plurality of columns that correspond to the number of violations or errors identified in the received versions of the code by the code verification engine 202. As with tabbed region 402, the violations or errors may be categorized by severity, such as red, orange, gray and green. Specifically, the tabbed region 404 may include a red error column 714, an orange error column 716, a gray error column 718, and a green check column 720. Within each column 714-720 is a column that corresponds to each version of the received code, such as a "9/08" version and a "7/08"

version, in a similar manner as described above. Accordingly, each color coded column 714-720 includes a "9/08" column, and a "7/08" sub column.

As shown in the tabbed region 404, the types of errors and their severity as identified in each version of the received code may be presented side-by-side so that a user, such as the project manager, may make a direct comparison of the types or categories of errors or violations that exist in each version of the received code, and their severity level. Thus, tabbed region 404, like tabbed region 402 (FIG. 4), also permits the project manager to quickly see whether progress is being made in reducing the number of coding violations or errors in the code being developed. Likewise, the project manager can see whether the number of coding violations or errors is actually increasing. The project manager can thus confirm that coding violations are being resolved, or in the alternative take action to address a rise in coding violations.

As shown in the tabbed region 404, the "9/08" version of the received code has 26 category red Overflow (OVFL) type errors, while the "7/08" version only had 14 category red Overflow type errors. In other words, the number of category red Overflow errors has actually increased. The interactive presentation engine 206 may also dynamically change the level of detail of the error information presented in the tabbed region 404, in response to user input, as indicated at block 316. Specifically, the interactive presentation engine 206 may present more detailed error information or alternatively more general or summarized error information.

Suppose, for example, that the project manager, would like to obtain additional detail as to where the new category red Overflow errors that were discovered in the "9/08" version of the received code are located. The project manager may direct the interactive presentation engine 206 to generate and present this additional information. More specifically, each row 710a-m of the tabbed region 404 that corresponds to a type or category of error may include a corresponding expander command button 724a-m, which may be represented as a plus sign. Upon selection of an expander button 724h, which corresponds to the Overflow error category, the interactive presentation engine 206 modifies the tabbed region 404, e.g., redraws it on the display 120, to include information on where the errors corresponding to the selected error category were located in each version of the received code.

FIG. 8 is a schematic illustration of a revised Run-Time Errors By Category tabbed region 804 of the analysis report 400, as redrawn by the interactive presentation engine 206. Specifically, engine 206 has added a new row for each entity or program element at the top hierarchical level of the received code. As discussed above, the received code has two entities at the top hierarchical level, a "project1.sln" project entity, and a "project2.sln" project entity. Accordingly, the revised tabbed region 804 includes a row 710n for the "project1.sln" entity, and a row 710o for the "project2.sln" entity.

By reviewing the information contained in the revised tabbed region 804, the project manager can obtain further insight into the coding violations or errors that exist in the current version of the software, i.e., version "9/08". Specifically, as shown, in FIG. 8, most of the 12 new category red Overflow errors that were identified in the "9/08" version of the received code are located in the "project1.sln" entity. Because a hierarchical level of the received code exists below the project entity level, the interactive presentation engine 206 may include an expander button for each of the new rows 710n and 710o that correspond to the "project1.sln" and "project2.sln" entities. Specifically, new row 710n may include expander button 724n, and new row 710o may include expander button 724o. In response to selection of either expander button 724n or 724o by the user, engine 206 may further revise the tabbed region 804 to include additional rows for the entities or program elements organized below the project level, e.g., files.

In response to the selection of the expander command button 724n for row 710n, engine 206 may generate a further revised tabbed region 904 as illustrated in FIG. 9. Specifically, engine 206 may add additional rows for the entities or program elements organized below the selected "project1.sln" entity. As discussed above, the "project1.sln" entity includes two files, a "file11.c" file and a "file12.c" file. Accordingly, a new row 710p is created for the "file11.c" entity, and a new row 710q is created for the "file12.c" entity. Because a hierarchical level exists below the file level, the interactive presentation engine 206 may include an expander button for each of the new rows 710p and 710q. In addition, engine 206 may replace the expander button 724n for the "project1.sln" entity with a collapse command button on the revised tabbed region 904, such as command button 726n, which may be represented as a minus sign. In response to the selection of the collapse command button 726n by a user, engine 206 may revise the tabbed region 904 by eliminating rows 710p and 710q, essentially returning the tabbed region 904 back to the form illustrated in FIG. 8.

Figure 10:
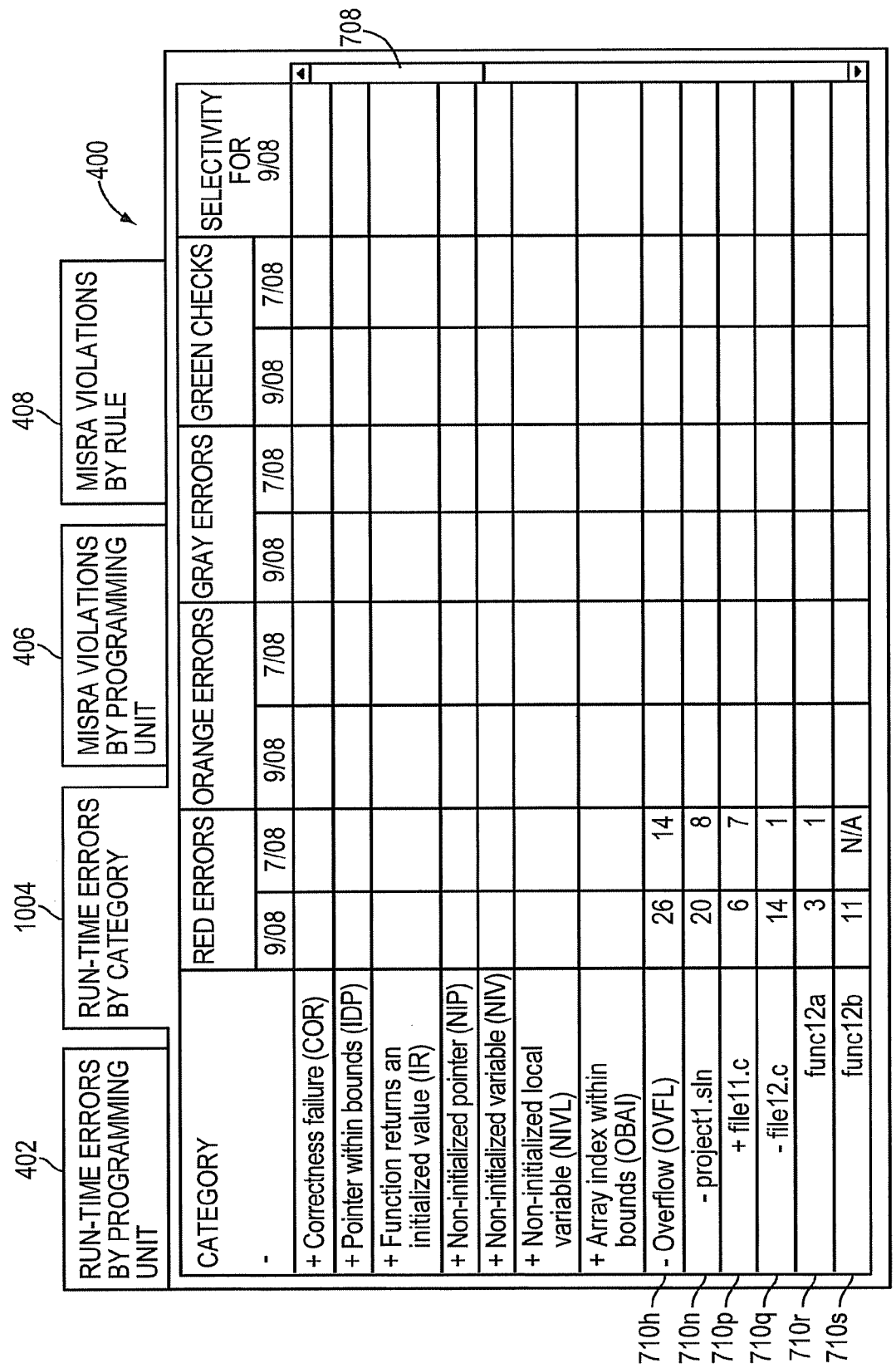

To obtain further detailed information, the project manager may select the expander button 724q of row 710q. In response, the interactive presentation engine 206 may generate a further revised tabbed region 1004 as shown in FIG. 10. The further revised tabbed region 1004 includes additional rows for the entities or program elements organized below the selected "file12.c" entity. As discussed above, the "file12.c" file includes two function entities, a "func12a" function and a "func12b" function. Accordingly, a new row 710r is created for the "func12a" function, and a new row 710s is created for the "funct12b" function.

As shown, by using the expander and collapse command buttons, a user, such as the project manager, can obtain particular information regarding the errors or violations identified by the code verification engine 202, as well as the type or category of errors, e.g., Overflow (OVFL), the severity of the errors, e.g., red, orange, etc. and the location of the errors within each version of the received code. This information, moreover, may be presented in a side-by-side arrangement for direct comparative analysis by the user.

The tabbed regions 406 and 408 corresponding to MISRA coding violations may operate in a similar manner as described above in connection with the Run-Time Errors By Programming Unit and Run-Time Errors By Category tabbed regions 402 and 404.

Those skilled in the art will understand that various modifications may be made to the analysis report and still achieve the objects of the present invention. For example, the information contained in tabbed regions 406 and 408 may be consolidated into a single tabbed region that presents the MISRA violations.

Code Differencing with Violations Overlay

The code differencing engine 204 may perform a comparison of the received versions of the code, e.g., the current version and the base version, as indicated at block 318 (FIG. 3B). The code differencing engine 204 may store the identified differences, e.g., newly added code, changed code, deleted code, etc., in memory, such as in main memory 104, as indicated at block 320.

Figure 11:
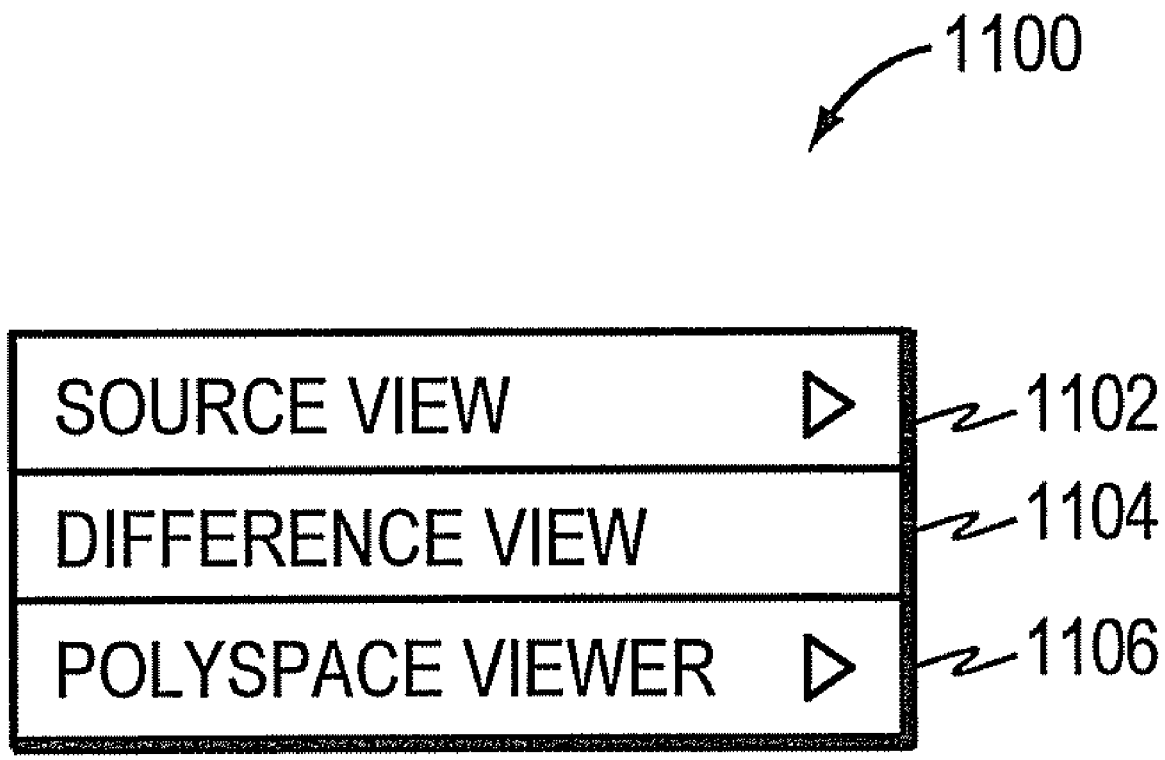
FIG. 11 is a schematic illustration of a popup command window.

In an embodiment, the interactive presentation engine 206 may generate and present a code comparison report to a user, such as the project manager, that additionally includes coding error or violation information. For example, with reference to FIG. 6, suppose the user is interested in determining where in the "func12b" function corresponding to row 410h, the identified errors occurred. The user may select, e.g., right-click with the mouse 118, the entity or program element of interest, e.g., "func12b". In response to the selection of an entity or programming element from the analysis report 400, the interactive presentation engine 206 may present a popup command window, e.g., on display 120. FIG. 11 is a schematic illustration of a popup command window 1100. The popup command window 1100 may present a plurality of commands for selection by the user, including a Source View command 1102, a Difference View command 1104, and a PolySpace Viewer command 1106. In response to the selection of the Difference View command 1104, engine 206 may generate and present a code comparison or differencing report, as indicated at block 322, and may include coding error or violation information overlaid thereon, as indicated at block 324.

FIG. 12 is a schematic illustration of a code comparison and violation report 1200. In an embodiment, report 1200 may be presented on the display 120 (FIG. 1). The report 1200 may include a source code listing of each received version of the selected entity or programming element. Specifically, report 1200 may include a base source code listing 1202, and a current source code listing 1204. The base source code listing 1202 represents the source code of the base version of the received code, e.g., version "7/08", for the selected entity or programming element, e.g., the "func12b" function. The current source code listing 1204 represents the source code of the current version of the received code, e.g., version "9/08", for the selected entity or programming element. In an embodiment, the listings may be presented in terms of sequentially numbered lines of code. The two listings 1202, 1204 may be presented side-by-side as illustrated in FIG. 12, such that the two listings are horizontally aligned with each other. That is, to the extent, a given line, such as line 10, of the two listings is found to match, engine 206 presents these two lines at the same horizontal level within report 1200. Report 1200 may include a vertical scroll bar 1206 for moving through the source code listings. In an embodiment, in response to the operation of the vertical scroll bar 1206 by a user, engine 206 moves both listings 1202, 1204, e.g., up or down, such that they remain aligned with each other.

In an embodiment, engine 206 may employ various graphical elements to illustrate the differences that were identified between the two source code listings 1202, 1204. For example, a colored space, such as space 1208 may be added to the base version of the received code, e.g., version "7/08", to illustrate where new code, indicated at reference numeral 1210, has been added to the current version, e.g., version "9/08". It should be understood that additional graphical elements, such as connecting lines between listings 1202 and 1204, may alternatively or additionally be used. Other graphical or symbolic elements may be used by engine 206 to illustrate deleted and changed or modified code.

In addition, other graphical or symbolic elements may be used by engine 206 to illustrate the location within the source code listings 1202, 1204 of coding errors or violations identified by the code verification engine 202. In an embodiment, the selected graphical or symbolic elements may also indicate to the user the severity level of the respective coding error or violation, e.g., red, orange, gray and green. Exemplary graphical or symbolic elements that may be used to indicate coding violations or errors include font styles, such as bold and italics, font effects, such as strikethrough and shadow, font size, font color, and text animation effects, such as blinking backgrounds and marching red ants borders, among other things. Those skilled in the art will understand that other graphical or symbolic elements may be employed.

In an embodiment, category red errors may be illustrated in the side-by-side listings 1202, 1204 by red font color. Category orange errors may be illustrated by orange font color. Category gray errors may be illustrated by gray font color, and category green checks may be illustrated by green font color. For example, a category red error 1212 is illustrated in the code listing 1202 for the base version "7/08". Category orange errors 1214, 1216 are also illustrated in the base version "7/08". Similarly, green checks 1218, 1220, 1222 and 1224 are illustrated in the base version "7/08".

Category red errors 1226, 1228 are illustrated in the source code listing 1204 for the current version "9/08". Similarly, category orange, gray and green errors may also be illustrated in the current version "9/08" by overlying graphical or symbolic elements on the source code listing 1204.

The interactive presentation engine 206 may also generate an error category locator 1230, 1232 for each source code listing 1202, 1204, and present the locators 1230, 1232 on the report 1200 to facilitate a user in locating errors or violations of a particular category or type. Each error category locator 1230, 1232 may include an entry for each category of coding error or violation. Specifically, the error category locator 1230 may include a series of columns each corresponding to a particular category or type of error or violation. More specifically, the error category locator 1230 may have a blue (B) column 1234 that identifies where checks were performed in the respective source code, a red (R) column 1236 that identifies where category red errors were located, an orange (O) column 1238 that identifies where category orange errors were located, a gray (G) column 1240 that identifies where category gray errors were located, and a green (Gm) column 1242 that identifies where green checks were located. In particular, within each column 1236-1242 are one or more symbols or glyphs, such as bullets. Each such bullet may be aligned horizontally with the line at which the corresponding type or category of error is located in the respective source code listing. A first bullet 1244 in the red column 1236, for example, is aligned with line 18 of the base source code listing "7/08", thereby indicating the presence of a category red error at this line of code.

Error category locator 1232, which is associated with the source code listing 1204 for the current version of received code also includes a blue (B) column 1246 that identifies where checks were performed, a red (R) column 1248 that identifies where category red errors were located, an orange (O) column 1250 that identifies where category orange errors were located, a gray (G) column 1252 that identifies where category gray errors were located, and a green (Gm) column 1254 that identifies where green checks were located. In particular, bullets 1256 and 1258 located in the red column 1248 identify category red errors in the source code listing for the current version "9/08" at lines 17 and 22, respectively.

The error category locators 1230, 1232 may also be tied to the vertical scroll bar 1206 such that operation of the vertical scroll bar 1206 also moves the error category locators 1230, 1232 in synch with the source listings 1202, 1204. It should be understood that, by operating the vertical scroll bar 1206, a user may quickly locate the errors associated with a particular category, e.g., red.

In an embodiment, the interactive presentation engine 206 is also configured to provide additional information to the user regarding the errors or violations. Specifically, engine 206 may be configured to detect when a user, e.g., operating the mouse 118, "hovers" the cursor over a selected error in source code listing 1202, 1204, such as error 1214. In response to the mouse hovering over a selected error, engine 206 may be configured to generate a popup window on the report 1200, as indicated at block 326. The popup window may contain additional information regarding the selected error, such as the type of error.

FIG. 13 is a schematic illustration of a popup window 1300 containing additional information regarding a violation or error. The popup window 1300 indicates that the identified violation is a violation of MISRA Rule 15.3, and was located at line 34.

Those skilled in the art will understand that the information contained in report 1200 may be organized or arranged in other ways. For example, additional graphical or symbolic elements may be employed by engine 206 to identify the type or category or error (OVL) in the source code listings 102, 1204.

It should also be understood that engine 206 may be configured to print copies of reports 400 and/or 1200, or save reports 400 and/or 1200 as electronic files. Reports 400 and/or 1200 may be saved as in HTML, HTML slideshow, XML, Excel spreadsheet or UNIX diff formats, among others.

Graphical Code

In an embodiment, the received code may be graphical code. For example, the received code may be two or more Simulink models, Rational Rhapsody models, LabVIEW front panel and/or block diagrams, Agilent VEE block diagrams etc. The code differencing engine 204 may be configured to compare the two or more versions of graphical code or graphical programs, and identify the differences between them, such as deleted elements, added elements or changed elements. Engine 206, moreover, may be configured to generate and present a report that illustrates the differences that were identified in the received versions of the graphical code or program. For example, rather than present text-based source code listings 1202, 1204 as shown in FIG. 12, engine 206 may a report that includes the two versions of graphical code, e.g., block diagrams, annotated to show the differences between them and including the identified coding errors or violations.

Suitable graphical differencing tools are described in U.S. Pat. Nos. 5,974,254 titled Method for Detecting Differences Between Graphical Programs, issued Oct. 26, 1999, and 6,138,270 titled System, Method and Memory Medium for Detecting Differences Between Graphical Programs, issued Oct. 24, 2000, which are hereby incorporated by reference in their entirety, the SimDiff software from EnSoft Corp. of Ames, Iowa, and the DiffMerge tool for Rational Rhapsody from IBM Corp. of Armonk, N.Y.

Figure 14:
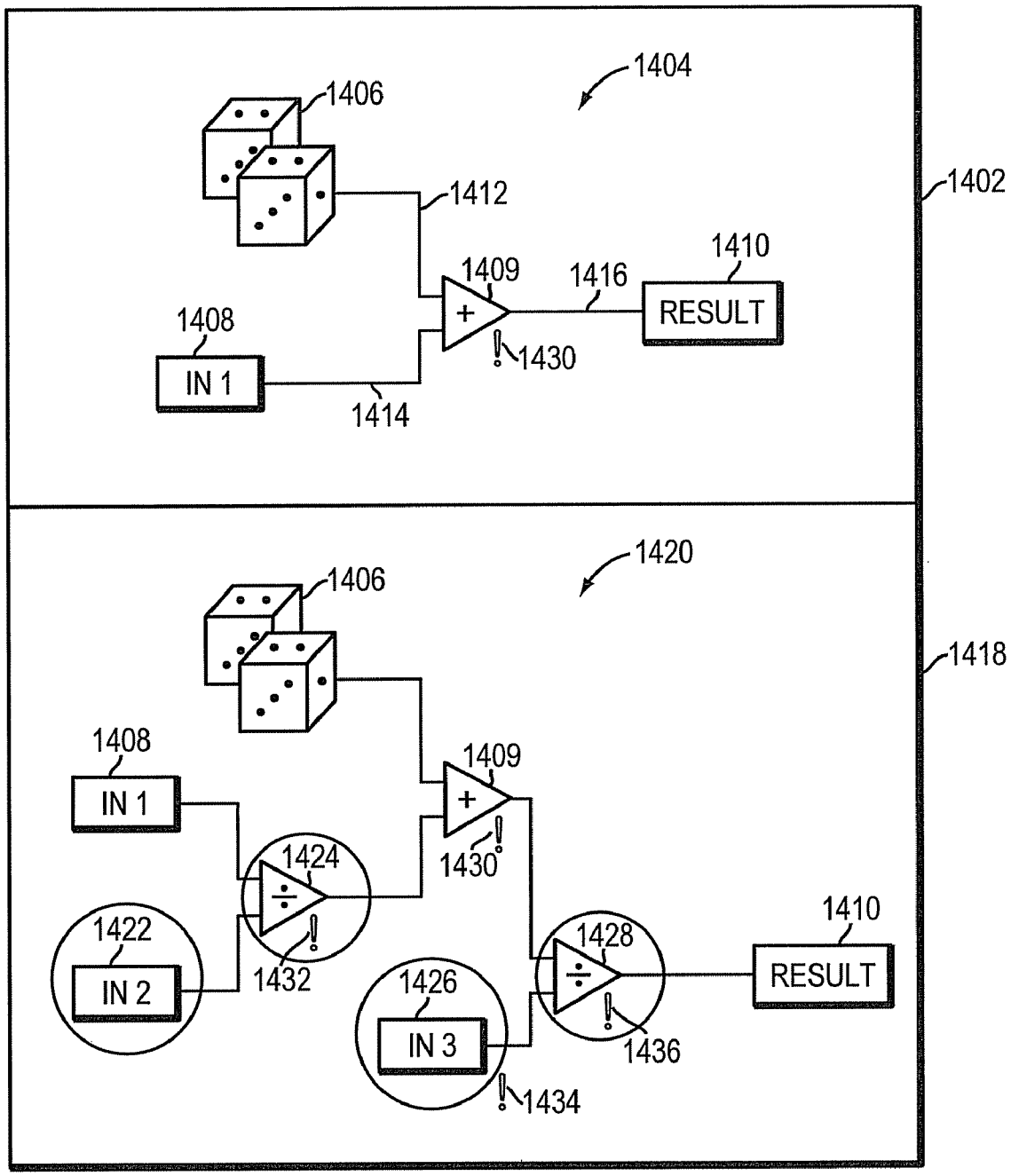
FIG. 14 is a schematic illustration of a graphical differencing report.

FIG. 14 is a schematic illustration of a graphical differencing and error code Graphical User Interface (GUI) 1400 that may be created and presented by engine 206, based on received versions of graphical code. In particular the differencing window 1400 may include a first pane 1402 that displays a first version of a received graphical program 1404. The first version 1404 may include a plurality of components or nodes, such as nodes 1406, 1408, 1409 and 1410, interconnected by lines or wires, such as lines 1412, 1414 and 1416. Window 1400 may also include a second pane 1418 that displays a second, e.g., more recent, version of a received graphical program 1420. The second version 1420 also includes nodes 1406, 1408, 1409 and 1410. However, it also includes several new nodes that were not present in the first version 1404. Specifically, second version 1420 also includes new nodes 1422, 1424, 1426, and 1428.

In an embodiment, engine 206 presents panes 1402 and 1418 adjacent to each other, e.g., vertically stacked, so that a user may readily perceive the differences between the two versions 1404 and 1420. In addition, the code differencing engine 204 may analyze the two versions of received graphical code 1404 and 1420, and identify the differences between them. Engine 206, moreover, may mark the identified differences on the GUI 1400. For example, engine 206 may place a circle around each of the newly added nodes 1422, 1424, 1426, and 1428 to indicate that these nodes have been added. Other graphical elements may be used to show the deletion and modification of nodes.

The code verification engine 202 may analyze each version of received graphical code 1404 and 1420 and identify the coding standard violations or errors therein. Engine 206, moreover, may overlay these identified violations or errors on the GUI 1400. Suppose, for example, that an error was identified with regard to node 1409 by the code verification engine 202. Engine 206 may indicate the presence of such error by adding a graphical element to the GUI 1400 that is associated with node 1409, such as an exclamation point 1430. Suppose further that errors were also identified with regard to nodes 1424, 1426 and 1428. In this case, engine may present error symbols for each such node, e.g., exclamation points 1432, 1434 and 1436.

In an embodiment, in response to a user selecting an error symbol, e.g., exclamation point 1436, engine 206 may present, e.g., through a popup window or dialog box, information concerning the respective violation or error, such as the type of error and its severity. It should be understood that, to the extent a node represents a subsystem, in response to a user selecting, e.g., with the mouse, a subsystem, engine 206 may generate and present, e.g., on the display 120, the nodes or components of the subsystem, including graphical elements indicating the presence of errors identified in one or more these nodes or components.

In a further embodiment, the received code may be code generated from a graphical model or block diagram. That is, each version of the received code may be textual source code that was generated from a corresponding version of a graphical model or block diagram created by a programmer or developer. This generated code, moreover, may include hooks or links that link portions of the generated code to corresponding portions, e.g., nodes or components, of the graphical model. As described above, this generated code may be analyzed for violations or errors, and an analysis report generated and presented to a user. Furthermore, because the generated code includes hooks or links, violations or errors can be traced back to corresponding locations in the graphical models or block diagrams.

Suitable tools for generating code from graphical models or block diagrams include the Real-Time Workshop® code generation tool from The MathWorks, Inc., and are described in U.S. Pat. Nos. 7,503,027 and 7,367,012, which are hereby incorporated by reference in its entirety.

In an embodiment, a computer readable media stores computer executable instructions that when executed on processing logic verify computer code. The media stores one or more instructions including instructions for storing a first version of the computer code in a memory, storing a second version of the computer code in the memory, analyzing, by a processor coupled to the memory, the first version of the computer code to identify one or more violations of a coding standard in the first version of the computer code, analyzing the second version of the computer code to identify zero or more violations of the coding standard in the second version of the computer code, analyzing the first and second versions of the computer code to identify one or more differences between the first and second versions of the computer code, and displaying simultaneously in a graphical user interface (GUI) at least a portion of the first and second versions of the computer code. The GUI may include a first element that indicates at least one of the one or more differences identified between the first and second versions of the computer code, a second element that indicates a location of at least one of the one or more violations of the coding standard identified in the first version of the computer code, and a third element that indicates absence of violations of the coding standard or locations of violations of the coding standard identified in the second version of the computer code.

In a further embodiment, an apparatus for verifying correct operation of computer code includes processing logic configured to store a first version of a project in a memory, the first version including at least one code file, the at least one code file having at least one function, store a second version of the project, the second version comprising the at least one code file, and the at least one function, analyze the first version of the project to identify one or more violations of a coding standard in the first version of the computer code, analyze the second version of the project to identify zero or more violations of the coding standard in the second version of the computer code, and a display operatively coupled to the processing logic for displaying a graphical user interface (GUI). The GUI may include a project tree that hierarchically lists the project, the at least one code file and the at least one function, for the first version of the computer code, the number of errors from the first set that were found in each of the project, the at least one code file, and the at least one function, and for the second version of the code, the number of errors from the second set that were found in each of the project, the at least one code file, and the at least one function.

In yet another embodiment, one or more computer readable media store computer executable instructions that when executed on processing logic verify computer code. The media store one or more instructions including instructions for storing a first version of the computer code in a memory, storing a second version of the computer code in the memory, analyzing, by a processor coupled to the memory, the first version of the computer code to identify a plurality of violations of a coding standard in the first version of the computer code, analyzing, by the processor, the second version of the computer code to identify a plurality of violations of the coding standard in the second version of the computer code, analyzing the first and second versions of the computer code to identify one or more differences between the first and second versions of the computer code, and presenting a differencing window that includes at least a portion of the first version of the computer code with at least one of the respective coding standard violations overlaid, and at least a corresponding portion of the second version of the computer with at least one of the respective coding violations overlaid.

The foregoing description has been directed to specific embodiments of the present invention. It will be apparent, however, that other variations and modifications may be made to the described embodiments, with the attainment of some or all of their advantages. For example, rather than presenting the number of errors identified in different versions side-by-side, they may be spaced from each other, presented in a vertical arrangement on top of each other, etc. Therefore, it is the object of the appended claims to cover all such variations and modifications as come within the true spirit and scope of the invention.

What is claimed is:

1. One or more non-transitory computer readable media storing computer executable instructions that when executed on processing logic verify computer code, the media storing one or more instructions comprising instructions for:
    storing a first version of the computer code in a memory;
    storing a second version of the computer code in the memory;
    analyzing, by a processor coupled to the memory, the first version of the computer code to identify one or more violations of a coding standard in the first version of the computer code, wherein at least one violation of the coding standard identified in the first version of the computer code is a run-time error;
    analyzing, by the processor, the second version of the computer code to identify zero or more violations of the coding standard in the second version of the computer code;
    analyzing the first and second versions of the computer code to identify one or more differences between the first and second versions of the computer code; and
    displaying simultaneously in a user interface (UI) at least a portion of the first and second versions of the computer code,
    wherein the UI includes:
        a first element that indicates at least one of the one or more differences identified between the first and second versions of the computer code,
        a second element that indicates a location of at least one of the one or more violations of the coding standard identified in the first version of the computer code,
        a third element that indicates absence of violations of the coding standard or locations of violations of the coding standard identified in the second version of the computer code, and
        a fourth element that indicates reproduction steps for the run-time error.

2. The media of claim 1 wherein the computer code is text-based code.

3. The media of claim 1 wherein the computer code represents a graphical model.

4. The media of claim 1 wherein the UI represents a graphical user interface.

5. The media of claim 1 wherein the UI represents a textual user interface.

6. The media of claim 2 wherein the text-based code is one or a combination of: C code, C++ code, C# code, assembly code, hardware description language code, hardware synthesis code, Java code, or Ada code.

7. The media of claim 2, wherein the analyzing of the first and second versions of the computer code to identify one or more differences between the first and second versions of the computer code comprises instructions for using a longest common subsequence (LCS) methodology.

8. The media of claim 2, wherein the analyzing of the first and second versions of the computer code to identify one or more differences between the first and second versions of the computer code comprises instructions for using change detection in hierarchically structured information.

9. The media of claim 1, wherein the fourth element further comprises an indication of at least one input needed to reproduce the run-time error.

10. The media of claim 1, wherein the coding standard is a static analysis coding 2 standard.

11. The media of claim 10, wherein the coding standard is one or a combination of: a Motor Industry Software Reliability Association (MISRA) coding standard, a static analysis, a dynamic analysis, and a software requirements analysis.

12. The media of claim 1 wherein the second and third elements of the UI are color-coded to indicate a severity of the respective error.

13. The media of claim 1, wherein the first version of the code is generated from a first graphical model that represents a first system, and wherein the second version of the code is generated from a second graphical model, the second graphical model being either a revision of the first graphical model or an other model of the first system.

14. The media of claim 3, wherein the analyzing of the first and second versions of the computer code to identify the one or more differences between the first and second versions of the computer code comprises instructions for identifying one or more differences using a graphical comparison, a semantic comparison, or a graphical and semantic comparison.

15. An apparatus including a processor for verifying correct operation of computer code of a project, the apparatus comprising:
   processing logic configured to:
      store a first version of the computer code of the project in a memory, the first version of the computer code including at least one code file, the at least one code file having at least one function;
      store a second version of the computer code of the project, the second version of the computer code comprising the at least one code file, and the at least one function;
      analyze the first version of the computer code of the project to identify a first set of errors in the first version of the computer code, wherein at least one error of the first set of errors is a run-time error;
      analyze the second version of the computer code of the project to identify a second set of errors in the second version of the computer code; and
   a display operatively coupled to the processing logic for displaying a user interface (UI), wherein the UI includes:
      a project tree that hierarchically lists the project, the at least one code file and the at least one function,
      for the first version of the computer code, a number of errors from the first set that were found in each of the project, the at least one code file, and the at least one function, and
      for the second version of the computer code, a number of errors from the second set that were found in each of the project, the at least one code file, and the at least one function, wherein the number of errors from the first and the second sets are segregated based on a severity of the respective errors, and
      reproduction steps for the run-time error.

16. The apparatus of claim 15 wherein the first and second versions of the code for the at least one function are shown side-by-side.

17. The apparatus of claim 15 wherein the processing logic is further configured to expand the project tree in response to user input to display error information for additional hierarchical levels of the project in the UI.

18. The apparatus of claim 15 wherein the processing logic is further configured to collapse the project tree in response to user input to reduce the amount of error 3 information displayed in the UI.

19. The apparatus of claim 15 wherein the processing logic is further configured to display on the display a differencing report in response to user input, wherein the differencing report illustrates one or more differences between the first version and the second version of a selected function.

20. The apparatus of claim 19 wherein the differencing report includes a source code listing for the first and second versions of the selected function, and the one or more differences are color-coded.

21. One or more non-transitory computer readable media storing computer executable instructions that when executed on processing logic verify computer code, the media storing one or more instructions comprising instructions for:
   storing a first version of the computer code in a memory;
   storing a second version of the computer code in the memory;
   analyzing, by a processor coupled to the memory, the first version of the computer code to identify a plurality of violations of a coding standard in the first version of the computer code, wherein at least one violation of the coding standard identified in the first version of the computer code is a run-time error;
   analyzing, by the processor, the second version of the computer code to identify a plurality of violations of the coding standard in the second version of the computer code;
   analyzing the first and second versions of the computer code to identify one or more differences between the first and second versions of the computer code; and
   presenting a differencing window that includes at least a portion of the first version of the computer code with at least one of the respective coding standard violations overlaid, at least a corresponding portion of the second version of the computer with at least one of the respective coding violations overlaid, and reproduction steps for the run-time error.

* * * * *

UNITED STATES PATENT AND TRADEMARK OFFICE
CERTIFICATE OF CORRECTION

PATENT NO. : 8,336,030 B1
APPLICATION NO. : 12/558305
DATED : December 18, 2012
INVENTOR(S) : David M. Boissy Page 1 of 1

It is certified that error appears in the above-identified patent and that said Letters Patent is hereby corrected as shown below:

In the Claims:

In col. 18, line 65 should read:
static analysis coding standard.

In col. 20, line 12 should read:
user input to reduce the amount of error information dis- Signed and Sealed this
Eighteenth Day of June, 2013

Teresa Stanek Rea
*Acting Director of the United States Patent and Trademark Office*